United States Patent
Mostowfi

(10) Patent No.: US 7,698,206 B2
(45) Date of Patent: Apr. 13, 2010

(54) DEBT COLLECTING AND FINANCING METHOD

(75) Inventor: Sheyda Mostowfi, Rotterdam (NL)

(73) Assignee: CollectByWeb Limited, Tortola (VG)

( * ) Notice: Subject to any disclaimer, the term of this patent is extended or adjusted under 35 U.S.C. 154(b) by 1790 days.

(21) Appl. No.: 10/715,014

(22) Filed: Nov. 17, 2003

(65) Prior Publication Data

US 2006/0184435 A1    Aug. 17, 2006

(51) Int. Cl.
*G06Q 40/00* (2006.01)
(52) U.S. Cl. .............................. 705/37; 705/38; 705/36; 705/35
(58) Field of Classification Search ............. 705/35–38, 705/34

See application file for complete search history.

(56) References Cited

U.S. PATENT DOCUMENTS 6,021,397 A * 2/2000 Jones et al. ................ 705/36 R
6,330,547 B1 * 12/2001 Martin ......................... 705/38
7,206,768 B1 * 4/2007 deGroeve et al. ............. 705/54
2001/0042785 A1 * 11/2001 Walker et al. ................ 235/379
2002/0152155 A1 * 10/2002 Greenwood et al. ........... 705/38
2003/0149647 A1 * 8/2003 Youngblood, Jr. ............ 705/35
2004/0117302 A1 * 6/2004 Weichert et al. .............. 705/40

OTHER PUBLICATIONS

Privacy Act of 1974; Systems of Records The Federal Register / FIND. Lanham: Feb 19, 2009. vol. 74, Iss. 032; p. 766.*

* cited by examiner

*Primary Examiner*—Frantzy Poinvil
*Assistant Examiner*—Clement Graham
(74) *Attorney, Agent, or Firm*—Thomas, Kayden, Horstemeyer and Risley, LLP; Todd Deveau

(57) ABSTRACT

The invention proposes an improvement for a method for collecting a debt. The method includes entering in a data processing system data at least including data concerning the debtor and the debt, permitting debt access to at least two parties to at least a part of the data entered in the system, and initiating an action for collecting the debt on a basis of the data entered in the database. The improvement comprises entering accounting data regarding accounts payable to the creditor and payments to the creditor into the system, enabling a financing party providing a loan to the creditor on the payable accounts to inspect at least a part of the accounting data for determining an amount of the loan based on at least the part of the accounting data.

16 Claims, 5 Drawing Sheets

DEBT COLLECTING AND FINANCING METHOD

FIELD OF THE INVENTION

The invention relates to a method for collecting a debt of a debtor to a creditor, the method comprising entering in a data processing system data at least comprising data concerning the debtor and the debt, permitting for the debt access for at least two parties to at least a part of the data entered in the system, and initiating an action for collecting the debt on a basis of the data entered in the database.

Further, the invention relates to a method determining an amount of a loan to a banking customer, the loan being based on accounts payable to the banking customer.

BACKGROUND OF THE INVENTION

In the Netherlands patent application 1021231 a debt collecting method is described for collecting a debt of a debtor, the debt being owed to a creditor. Data relating to the debt is stored in a data processing system. The data can be entered by the creditor or by any other authorised person, and comprises at least data concerning the debtor and the debt. Then, for the debt (for this case), access is permitted to other parties to at least a part of the data entered in the database. The party can e.g. comprise a debt collecting agency, a lawyer, a court, the debtor or the creditor. Based on the data entered in the database, an action is initiated by the system for collecting the debt. The action can e.g. comprise a sending of a letter to the debtor, a sending of instructions to perform a specific action to a party, etc.

SUMMARY OF THE INVENTION

The present invention intends to provide further improvements to the above method.

To achieve this goal, the method according to the invention comprises an improvement consisting of a) entering accounting data regarding accounts payable to the creditor and payments to the creditor into the system, and b) enabling a financing party providing a loan to the creditor on the payable accounts to inspect at least a part of the accounting data for determining an amount of the loan based on at least the part of the accounting data. According to the state of the art, a financing party, such as a bank, provides a loan to a party, in this case the creditor, a portfolio of payable accounts serving as security. From the sum of total, payable accounts, the financing party normally takes a percentage to determine a maximum amount of a loan to be provided by the financing party to the creditor. The percentage is normally based on guidelines, such as internal guidelines of the financing party and serve to cover risks of non-payment, etc. According to the invention, however, data concerning all relevant accounts payable is entered into the data processing system and payment concerning these accounts are also entered. The financing party is enabled to inspect at least a part of this data. From this part, the financing party can determine an amount of the loan. The financing party then, e.g., monitors the accounts payable as well as payments thereof, and depending on one or more parameters, such as payment behavior, sum of accounts payable, etc. amends the amount of the loan. As the financing party has access to at least a part of the accounting data, the financing party has a periodical or continuous insight into the status of payable accounts and payments thereof, which significantly reduces risks for the financing party. The reduced risks enable the financing party to provide the creditor to which the loan is provided with a higher loan sum, or better credit conditions, such as a lower interest rate, as a total risk for the financing party is reduced.

Advantageously, step b) comprises the step of b1) determining a rating from the at least part of the accounting data, the rating for determining an amount of the loan based thereon. Thus, to simplify inspection of the data by the financing party, a rating can be determined which enables an easy determination of an amount or maximum amount of the loan based thereon. The rating can comprise one or more of a group comprising an average duration of outstandingness of the payable accounts, a peak duration of the outstandingness of the payable accounts, a total number or sum of payable accounts, a total number or sum of overdue payable accounts, a total or sum of overdue, uncollectible payable accounts. Of course, any other suitable parameter can also be used.

In a further improvement of the known method, a status is assigned to each debt indicating a progress of the debt, a new status being assigned to the debt upon detection by the system of an action or response thereto, the new status preferably depending on a current status and a contents of the action. As a result, errors can be avoided as the status is assigned preferably by the system, based on the current status and contents of the detected action. As no human intervention is required, and preferably not possible, it is not possible to assign a status to the debt as well as to amend the status, and thus no wrong status can be assigned due to human intervention, the status being amended (if required) automatically by the system based on parameters such as the contents of the action, the current status, etc. Also, it is avoided that a required amendment of the status is omitted due to a human error. As a result, the status of the debt, or in a more correct formulation the status of the process of the collection of the debt, is purely determined by the entered data, entered actions, or any other data present in or available to the system. This will lead to the situation that the status as assigned by the system is authentic.

Advantageously, the method comprises the further step of determining a new action from the new status and/or the contents of the action. The new status can be assigned based on, e.g., a workflow. Thus, the system, upon detection of an action, autonomously determines a new status and more preferably a new action preferably assigning a party responsible for the new action and transmitting information on the new status to the party responsible for the new action. Thus, advantageously not only a new status is determined according to the invention, but also with the new status a new action is assigned, preferably with a person responsible for the action, information being transmitted to the party responsible for the new action.

The new status is preferably determined based on a workflow, i.e. a predetermined sequence of statuses and/or actions or responses to actions. Also, it is possible that the new action is derived from this workflow or from a separate workflow. A use of a workflow for determining a status and/or a new action provides for an easy, user convenient and effective process control.

The method according to the invention advantageously comprises assigning a fine to the party responsible for the action, when the action is not completed upon expiry of the time limit. When the action appears not to have been performed upon expiry of the time limit, suitable further steps can be initiated.

The method advantageously comprises the step of assigning to each action or expected action a time limit and a party responsible for the action. Thus, a "fair" system is created based on preferably predetermined rules defining what is to happen in case that a party does not meet a time limit. The party not meeting the time limit can be the debtor, or any other party involved in the collecting of the debt.

The method according to the invention advantageously further comprises entering a criterion which, upon fulfilment thereof, initiates an action, repetitively checking a debt for fulfilment of the criterion, and initiating the action upon fulfilment of the criterion. The action can thus not only be initiated by a previous action or a status, but advantageously also by a fulfilment of criterion. The criterion will be determined beforehand and provided, e.g. entered, into the system. Upon fulfilment of the criterion, the action is initiated. This provides for an additional flexibility as a contents of a to be initiated action can be determined based on fulfilment of the criterion. Advantageously, the criterion comprises a criterion for convicting a debtor by a court, the action comprising sending data concerning the debtor and the corresponding debt to the court, the method advantageously further comprising receiving a verdict from the court and sending the verdict to the debtor. Thus, the invention in this advantageous embodiment helps to reduce a work overload at a court, as debtors which comply to a criterion which would lead to a conviction by the court, are selected by the system and data concerning the debtors and debts are send to the court. This enables the court to efficiently handle these cases as only the debtor and corresponding debts, which have met the criterion, are sent to the court. It is imaginable that a judge of the court determines the criterion for conviction, which is entered into the system.

Looking from another perspective, the method for determining an amount of a loan to a banking customer comprises a) inspecting via a data processing system at least a part of accounting data regarding the payable accounts, the accounting data comprising data relating to all accounts payable to the banking customer and having been entered by the banking customer into the system, and b) determining an amount of the loan based on at least the part of the accounting data.

BRIEF DESCRIPTION OF THE DRAWINGS

Further features and advantages of the present invention will now be described with reference to the appended drawing, in which a non-limiting embodiment of the invention is shown, in which.

DETAILED DESCRIPTION OF THE EMBODIMENTS

Figure 1:
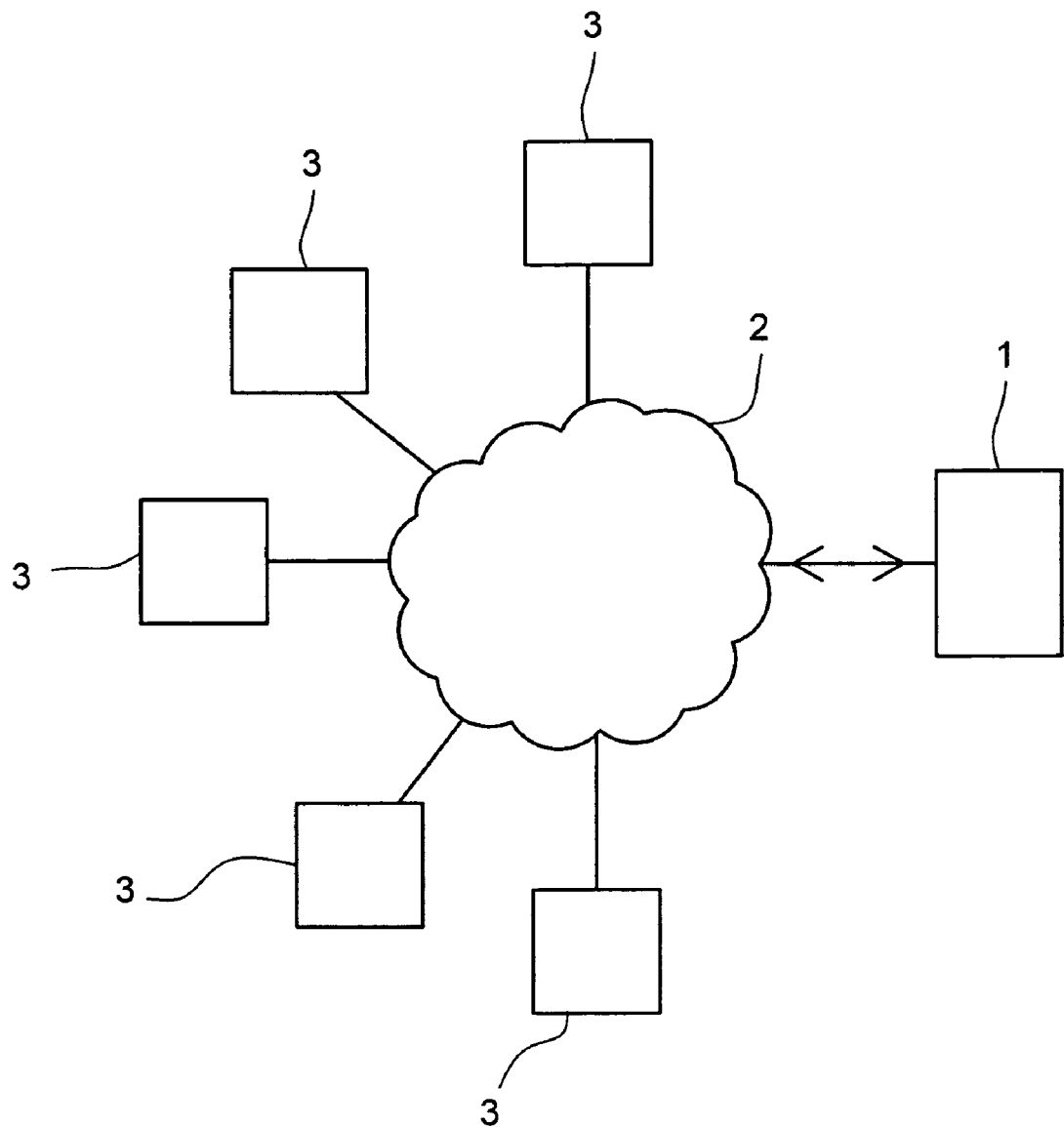
FIG. 1 shows a block schematic overview of a system according to the invention for implementing the method according to the invention.

The system schematically depicted in FIG. 1 comprises a data processing system 1, which is connected to a network 2 such as the internet, a wired or wireless communication network or any combination thereof. Via the network 2, the data processing system 1 is connected to a plurality of data processing terminals 3, such as mobile telephones, personal computers, notebook computers, computer systems, etc. The parties have access to at least a part of the data in the system 1 via the respective terminal 3 of the respective party and the network 2. The parties can comprise a debt collecting agency, a bailiff, a debt reduction or mediation agency, a financing party providing a loan, a court, a debtor, a creditor, etc. The operation of the system according to FIG. 1 will be further understood from the below FIGS. 2-5 and corresponding description thereof.

Figure 2:
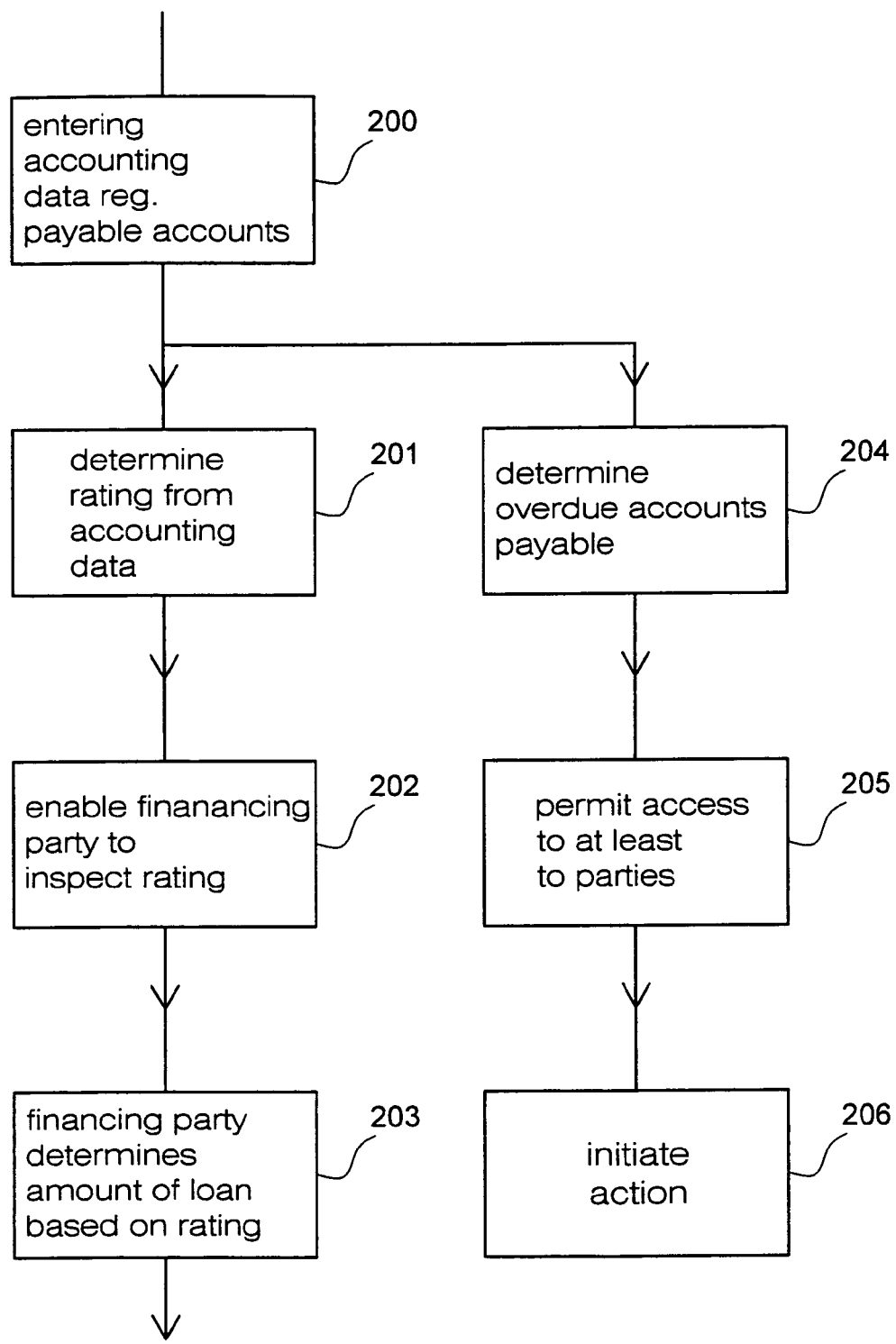
FIG. 2 shows a flow diagram of an embodiment of the method according to the invention.

In FIG. 2, in the step 200 accounting data is entered into the system regarding accounts payable by a debtor to a creditor. The accounting data preferably concerns any accounts payable, thus preferably not being restricted to overdue accounts only. In step 201 a rating is determined from the accounting data. The rating can comprise one or more of a group comprising an average duration of outstandingness of the payable accounts, a peak duration of the outstandingness of the payable accounts, a total number or sum of payable accounts, a total number or sum of overdue payable accounts, a total or sum of overdue, uncollectible payable accounts. In step 202, a financing party, such as a bank is enabled to view the rating. The financing party can be one of the parties being able to have access to at least a part of the data in the system 1 via a respective terminal 3. The financing party now determines in step 203 an amount of the loan based on the rating. Alternatively, the financing party can determine an amount of the loan based on a part of the accounting data. In step 204 it is determined if one or more of the accounts payable are overdue. For the overdue accounts, in step 205 access is permitted to at least two parties to at least a part of the data entered in the system, the data relating to the overdue account payable. In step 206, an action is initiated by the system for collecting the debt, i.e. the overdue account. Within the scope of the present invention, it is possible that the method according to the invention comprises the steps 200-206 as described, however it is also possible that within the scope of the present invention only steps 200, 201, 202 and 203 are implemented. An advantage of implementing steps 200-203 as well as 204-206 is that administration of payable accounts, financing and debt collection are provided for by a single, integrated process, and thus all actions related to the debt collection, the determination of a maximum loan, and accounting can all be formed efficiently and with minimum of human inter-operation and associated human errors.

Figure 3:
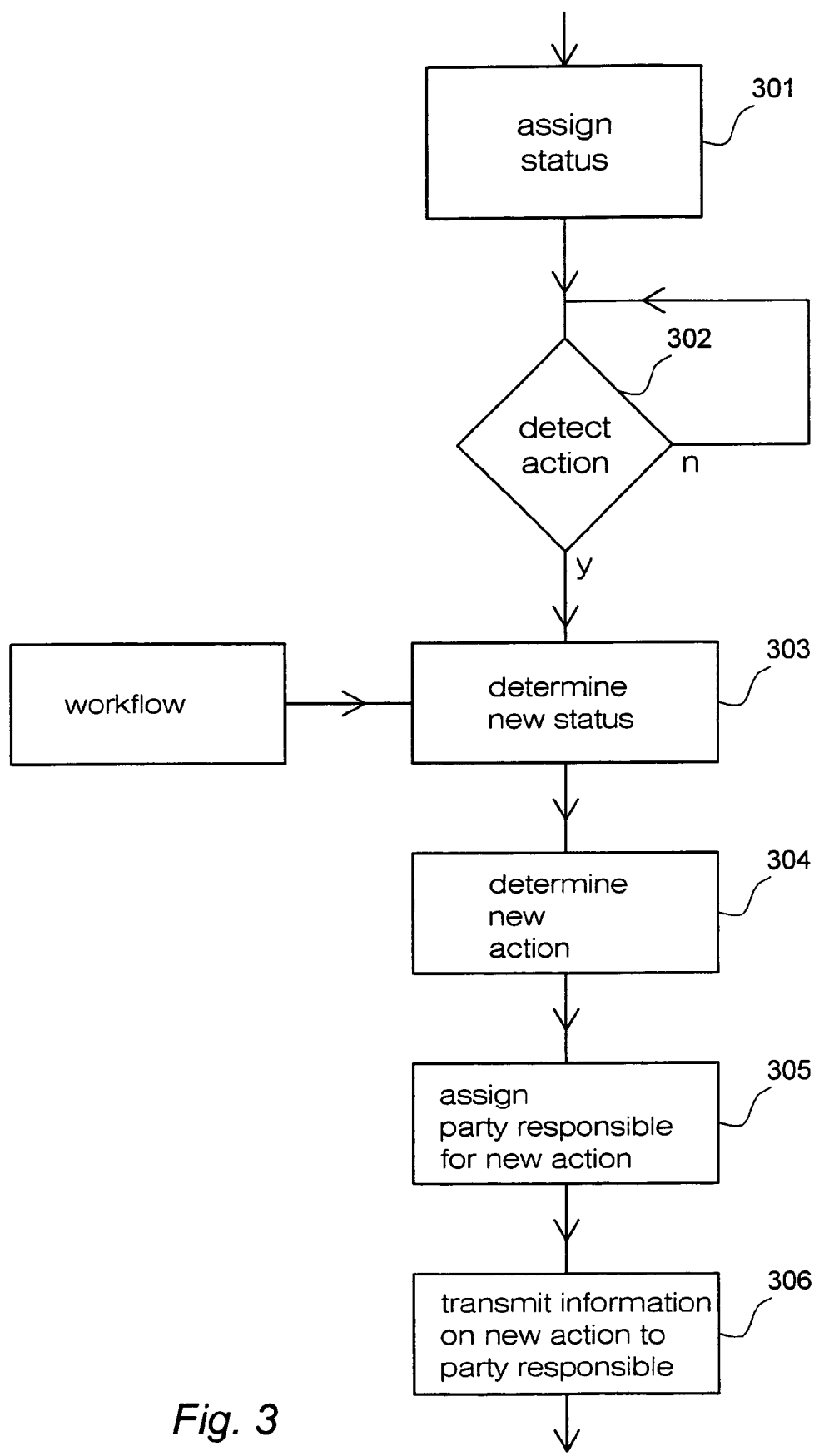
FIG. 3 shows a flow diagram of another embodiment of the method according to the invention.

In FIG. 3, in step 301 a status is assigned to a debt. The status can comprise any suitable status, such as "reminding letter sent to debtor", "debtor has responded", "debtor has not responded", "debt collecting agency informed", "debt regarded uncollectable", "payment schedule proposed to debtor", "payment schedule accepted or denied by debtor", "case to be transferred to a court for decision", etc. Then, in step 302 it is checked if an action for the case, thus for the specific debt is detected. If this not the case, the process returns to step 302 again. Instead of, or in addition to detecting an action, it is also possible that a response to an action is detected in step 302. If an action is detected, in step 303 a new status is determined. The new status may be based on the current, i.e. the "old" status and/or a content of the detected action. The new status may be determined based on a workflow comprising predetermined operational flows. Then, in step 304 a new action is determined, the new action may be based on the new status and/or a contents of the detected action or response thereto. In step 305 a party is assigned in respect of the new action, the party being responsible for the action. In step 306 information concerning the new action is transmitted to the party responsible. The steps 303, 304 and 305 can be performed in the described order, however may also be performed in any other or simultaneously. Step 301 can for example follow step 206 of FIG. 2, however it is also possible that the steps according to FIG. 3 are implemented in any debt collecting system and method.

Figure 4:
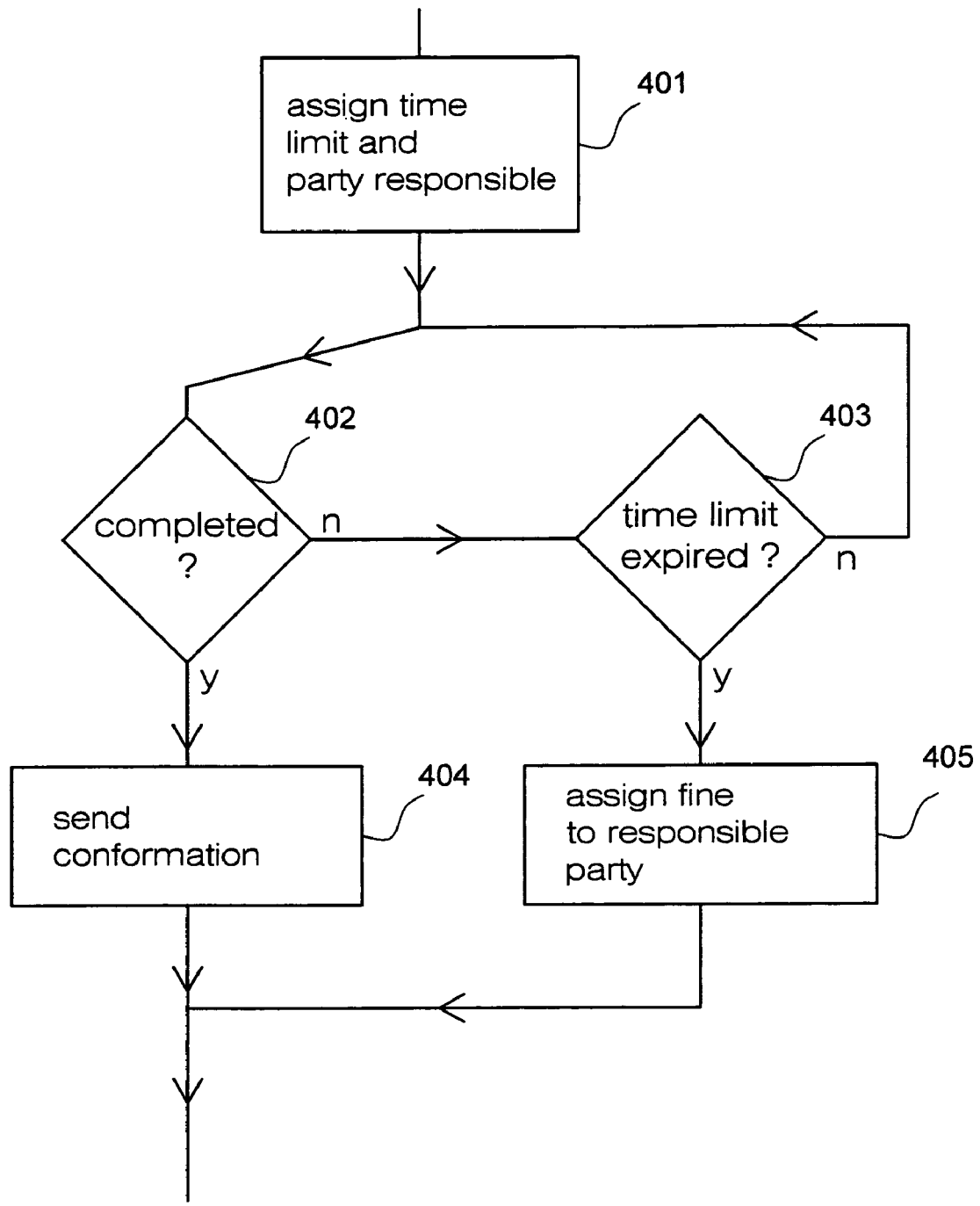
FIG. 4 shows flow diagram of yet another embodiment of the method according to the invention.

In step 401 a time limit and a party responsible are assigned to an action. The time limit can refer to a performance of the action or can refer to a time limit in which a response to the action is to be received. In step 402, it is checked if the action has been completed or respectively the response to the action has been completed. If completed, in step 404 a confirmation is sent to the party responsible. If in step 402 no completion is detected, in step 403 it is checked if the time limit has expired. If not expired, the process returns to step 402. If the time limit has expired, in step 405 a fine is assigned to the responsible party. An example of the steps as described in FIG. 4 is that a debt collecting agency needs to respond to a letter received from the debtor. In step 401, a time limit for the response is assigned to the debt collecting agency which will be the party responsible. If the debt collecting agency has responded in time by processing the letter and entering appropriate data into the system, a confirmation that the response has been processed can be send to the debtor in step 404. If the debt collecting agency however does not complete the process in time, in step 405 a fine can be assigned to the debt collecting agency. The fine can, e.g., be a monetary or a percentage of the bonus which should have been earned by the debt collecting agency for the processing of the letter or for the collection of the debt.

The steps according to FIG. 4 can be followed by, e.g., step 303 of FIG. 3, i.e. after completion of step 404 or 405 respectively, the process follows with step 303, however it is also possible that the steps according to FIG. 4 are implemented in any debt collecting method or system. Likewise, step 401 can, e.g., follow step 306 of FIG. 3. As a further embodiment, the fine can be applied to buy a present for the party adversely affected by the action. If for example it appears that a person responsible for the collection of the debt has made a human error, and due this error the debtor is adversely affected, the fine can be applied to provide an excuse letter and a small present to the debtor. An example is that the debtor has paid in time,; however due to a human error an unfriendly warning letter has been sent to the debtor, for which in fact no ground appeared to be present. As a compensation, the debtor can be supplied with a present, such as some flowers, a gift, or any other present, e.g. accompanied by an excuse letter. In this manner, it is avoided that a good relation with a customer is jeopardised due to an incorrect letter sent to him or other incorrect action performed in respect to him. Another example of assigning a fine to a party who has made a human error is assigning a fine to the creditor when the creditor does not enter all required data or enters incorrect data concerning the debt into the system.

Figure 5:
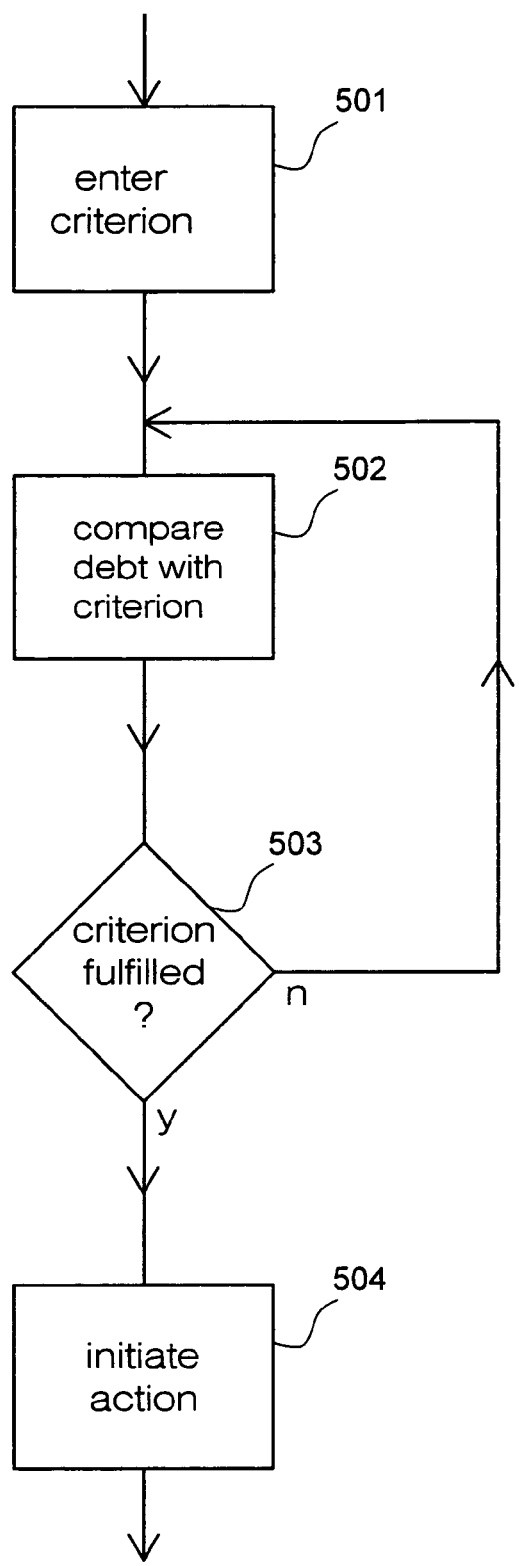
FIG. 5 shows a flow diagram of still yet another embodiment of the method according to the invention.

In FIG. 5, in step 501 a criterion is entered into the system. The criterion serves to initiate, upon fulfilment thereof, of an action. In step 502, the debt, or the status thereof is compared with the criterion. If in step 503 it appears that the criterion is not fulfilled, the process returns to step 502. If however in step 503 it appears that the criterion is fulfilled, the action is initiated with the steps according to FIG. 5, human interaction can be brought back to a minimum, as criteria, i.e. predetermined conditions which lead to performance of a predetermined action, essentially only need to be entered once. Thus, on the one hand human errors are avoided to a large extent, while on the other hand workload for (human) parties can be reduced as much as possible. If for example the criterion comprises a criterion for convicting a debtor by a court, and it appears that the criterion is fulfilled, the action can comprise a sending of data concerning the debtor and the corresponding debt to the court. The court thus automatically receives a debt fulfilling the criteria. If the criteria are set in co-operation with a judge such that the criteria coincide with criteria used by the judge for convicting a debtor to pay a debt, workload of the judge can be reduced too, as only cases, i.e. debts, for which the judge would have decided to convict the respective debtor, are transferred to the court. Thus, processing at the court can be significantly reduced too. It is even imaginable that the action in this example comprises a printing of a verdict, and sending the pre-printed verdict to the judge. The judge can than directly sign the verdict, and does not need to study each case in detail, as only the cases, i.e. only the debt fulfilling the predetermined criteria, are sent to, printed and presented to the judge. In this example, a further step can be a receiving of the verdict from the court and a sending of the verdict to the debtor. The steps according to FIG. 5 can be comprised in any debt collecting system and method, or can be combined in any suitable manner with the process steps according to any of the present embodiments described. A further example of the predetermined criteria are criteria for creating a debt repayment schedule. The system can in this example calculate terms for repayment of a part of the debt, include interest in the calculation and automatically enter terms at which payment are to be received in the system as well as assign a current status (e.g. not paid yet) to each of the payments.

Summarising, with the debt collecting method according to the invention, all parties communicate with each other via a single system, i.e. making use of a same database and being provided with information derived from a same database, i.e. with synchronous information. Further, a party that does not meet a time limit can be assigned a fine or any other disciplinary measure can be taken against him. Still further, with all parties involved in the debt collection, an agreement has been made regarding price, time limit and principles of co-operation (such as what happens when the party does not fulfil a time limit). As a result, an objective method for collecting the debt can be created as all parties are bound to such agreements. The method thus attempts to prevent representivity as much as possible, i.e. attempts to pass information directly to a party concerned avoiding intervention of other parties as much as possible. To make the system as objective as possible, the party operating the system is advantageously paid a fixed amount upon completion of the debt collecting process for a specific debt. Thus, a conflict of interest is prevented as normally a party involved would on the one hand attempt to collect the debt, however on the other hand would know that the more effort is to be spent, and the more steps are to be taken, the more costs can be charged to the creditor. Each action, each response, and each entry of data into the system is checked by the system. If an error not meeting a time limit or any other irregularity is detected, a corresponding action is taken by the system. Thus, a neutral, objective and self-guiding system is created.

A party to the system, not being a debtor, is automatically supplied by the system with an amount of work. If the party does not meet time limits, makes too many errors or informs the system that it does not wish to obtain any more cases for the time being, the system automatically assigns a new case to another party. A same mechanism is used for human operators working with the system, if an operator observes that his workload is getting too high, he is supposed to enter this into the system, upon entry of which the system will automatically assign tasks to other, e.g. further operators. If the operator in question, however, makes a request for systems at too late a moment in time a fine can be assigned to the operator in question, as a consequence of the too high workload, certain time limits will not be met. The fine assigned to the operator (such as a reduction of the payment made to him) can be used by the system for the fine to be paid to another party such as the creditor.

Moreover, as preferably data relating to all accounts payable have been entered into the system, a financing party, such as bank, having access to at least part of the data entered in the system, can determine an amount of a loan to be provided to the creditor based on the data, or on a rating calculated therefrom. As a result, a credit limit can be increased and/or a risk for the financing party can be reduced, as a determination of the maximum of the amount of the loan to be provided to the creditor can be based on actual, up to date data which has a high degree of credibility as all entries to the system are automatically checked as described above, by the system itself.

The invention claimed is:

1. In a method for collecting a debt of a debtor to a creditor, the method comprising:
    entering in a data processing system data at least comprising data concerning the debtor and the debt,
    permitting for the debt access for at least two parties to at least a part of the data entered in the system, and
    initiating an action for collecting the debt on a basis of the data entered in the database,
    an improvement consisting of:
        a) entering accounting data regarding accounts payable to the creditor and payments to the creditor into the system;
        b) enabling a financing party providing a loan to the creditor on the payable accounts to inspect at least a part of the accounting data for determining an amount of the loan based on at least the part of the accounting data;
        c) determining a rating from the at least part of the accounting data;
        d) determining an amount of the loan based on the rating; and
        e) providing the loan in the determined amount by the financing party to the creditor.

2. The method according to claim 1, wherein the accounting data comprises one or more of a group comprising an average duration of outstandingness of the payable accounts, a peak duration of the outstandingness of the payable accounts, a total number or sum of payable accounts, a total number or sum of overdue payable accounts, a total or sum of overdue, incollectible payable accounts.

3. The method according to claim 1, wherein a status is assigned to each debt indicating a progress of the debt, a new status being assigned to the debt upon detection by the system of an action or response thereto, the new status preferably depending on a current status and a contents of the action.

4. The method according to claim 3, comprising the further step of determining a new action from the new status and/or the contents of the action.

5. The method according to claim 4, comprising the step of:
    assigning a party responsible for the new action; and
    transmitting information on the new status to the party responsible for the new action.

6. The method according to claim 3, comprising determining the new status based on a workflow.

7. The method according to claim 1, further comprising assigning to each action or expected action a time limit and a party responsible for the action.

8. The method according to claim 7, comprising assigning a fine to the party responsible for the action, when the action is not completed upon expiry of the time limit.

9. The method according to claim 1, further comprising:
    entering a criterion which, upon fullfillment thereof, initiates an action;
    repetitively checking a debt for fullfillment of the criterion; and
    initiating the action upon fullfillment of the criterion.

10. The method according to claim 9, wherein the criterion comprises a criterion for convicting a debtor by a court, the action comprising sending data concerning the debtor and the corresponding debt to the court.

11. The method according to claim 10, comprising receiving a verdict from the court and sending the verdict to the debtor.

12. A method for determining an amount of a loan to a banking customer, the loan being based on accounts payable to the banking customer, the method comprising:
    a) inspecting via a data processing system at least a part of accounting data regarding the payable accounts, the accounting data comprising data relating to all accounts payable to the banking customer and having been entered by the banking customer into the system; and
    b) determining an amount of the loan based on at least the part of the accounting data;
    c) determining a rating from the at least part of the accounting data;
    d) determining an amount of the loan based on the rating; and
    e) providing the loan in the determined amount by the financing party to the creditor.

13. The method according to claim 12, wherein the system comprises a debt collecting system, the accounting data in the debt collecting system being further applied for initiating an action for collecting an amount of the payable account on a basis of the data entered in the database.

14. In a method for collecting a debt of a debtor to a creditor, the method comprising:
    entering in a data processing system data at least comprising data concerning the debtor and the debt;
    permitting for the debt access for at least two parties to at least a part of the data entered in the system;
    initiating an action for collecting the debt on a basis of the data entered in the database;
    entering a criterion which, upon fullfillment thereof, initiates an action;
    repetitively checking a debt for fullfillment of the criterion; and
    initiating the action upon fullfillment of the criterion.

15. The method of claim 14, wherein the criterion comprises a criterion for convicting a debtor by a court, and the action comprising sending data concerning the debtor and the corresponding debt to the court.

16. The method according to claim 15, comprising receiving a verdict from the court and sending the verdict to the debtor.

* * * * *